United States Patent
August et al.

(10) Patent No.: US 6,389,055 B1
(45) Date of Patent: *May 14, 2002

(54) INTEGRATING DIGITAL DATA WITH PERCEPTIBLE SIGNALS

(75) Inventors: Katherine G. August, Matawan; Gregory Alan Wright, Colts Neck; Theodore Sizer, II, Little Silver, all of NJ (US)

(73) Assignee: Lucent Technologies, Inc., Murrary Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,737
(22) Filed: Mar. 30, 1998
(51) Int. Cl.[7] .................................................. H04B 1/69
(52) U.S. Cl. ....................................................... 375/130
(58) Field of Search ................................ 375/130, 216; 348/467, 468, 461, 465, 460; 379/102.03, 90.01

(56) References Cited

U.S. PATENT DOCUMENTS

| | | | | |
|---|---|---|---|---|
| 4,425,642 A | * | 1/1984 | Moses et al. ............... | 375/200 |
| 4,425,661 A | * | 1/1984 | Moses et al. ............... | 375/200 |
| 4,807,031 A | * | 2/1989 | Broughton ................... | 358/142 |
| 4,894,789 A | * | 1/1990 | Yee ............................. | 348/552 |
| 5,121,476 A | * | 6/1992 | Yee ............................. | 348/552 |
| 5,243,423 A | * | 9/1993 | DeJean et al. .............. | 348/473 |
| 5,490,168 A | * | 2/1996 | Phillips et al. .............. | 375/224 |
| 5,570,295 A | * | 10/1996 | Isenberg et al. ......... | 379/90.01 |
| 5,579,124 A | * | 11/1996 | Aijala et al. .................. | 386/96 |
| 5,663,766 A | * | 9/1997 | Sizer, II ...................... | 348/473 |
| 5,671,267 A | * | 9/1997 | August et al. ......... | 379/102.03 |
| 5,737,026 A | * | 4/1998 | Lu et al. ...................... | 348/473 |
| 5,761,606 A | * | 6/1998 | Wolzien ...................... | 455/6.2 |
| 5,764,763 A | * | 6/1998 | Jensen et al. ................. | 380/6 |
| 5,774,452 A | * | 6/1998 | Wolosewicz ................ | 370/212 |

* cited by examiner

*Primary Examiner*—Young T. Tse
(74) *Attorney, Agent, or Firm*—Morgan & Finnegan, LLP

(57) ABSTRACT

A method for combining digital data with a perceptible program signal. The data stream is modulated onto an electromagnetic signal encoding the perceptible signal; the modulating employs a spread spectrum encoding of the data stream. The modulated program signal is transduced into perceptible form. A capture device receives the perceptible signal, and a decoder extracts the spread spectrum encoded data from the received signal. The method is particularly useful in encoding purchase information or watermarking information into the signal.

22 Claims, 6 Drawing Sheets

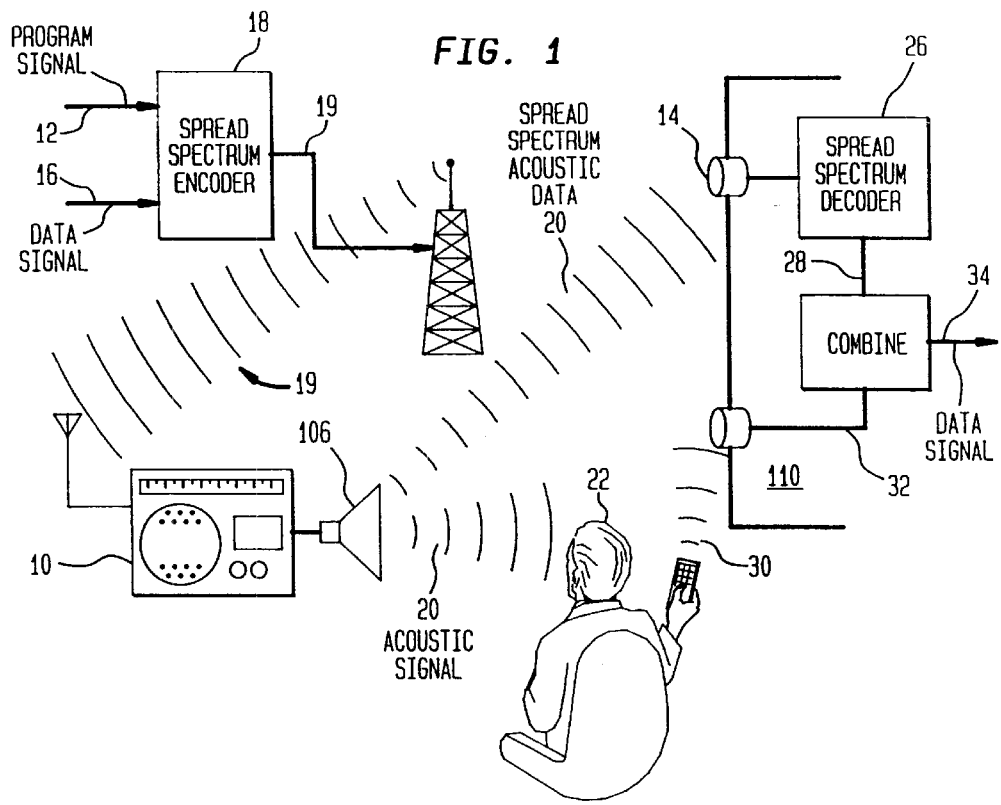
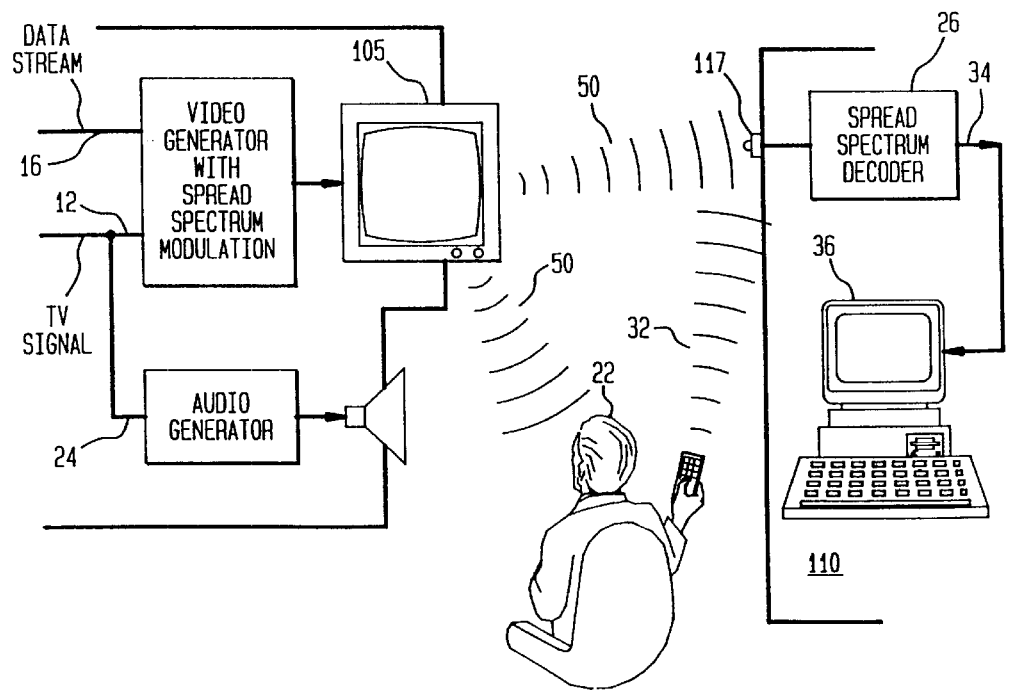

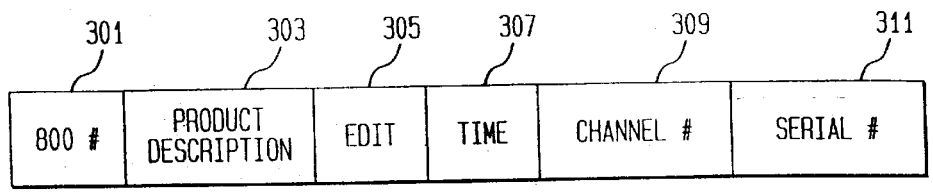
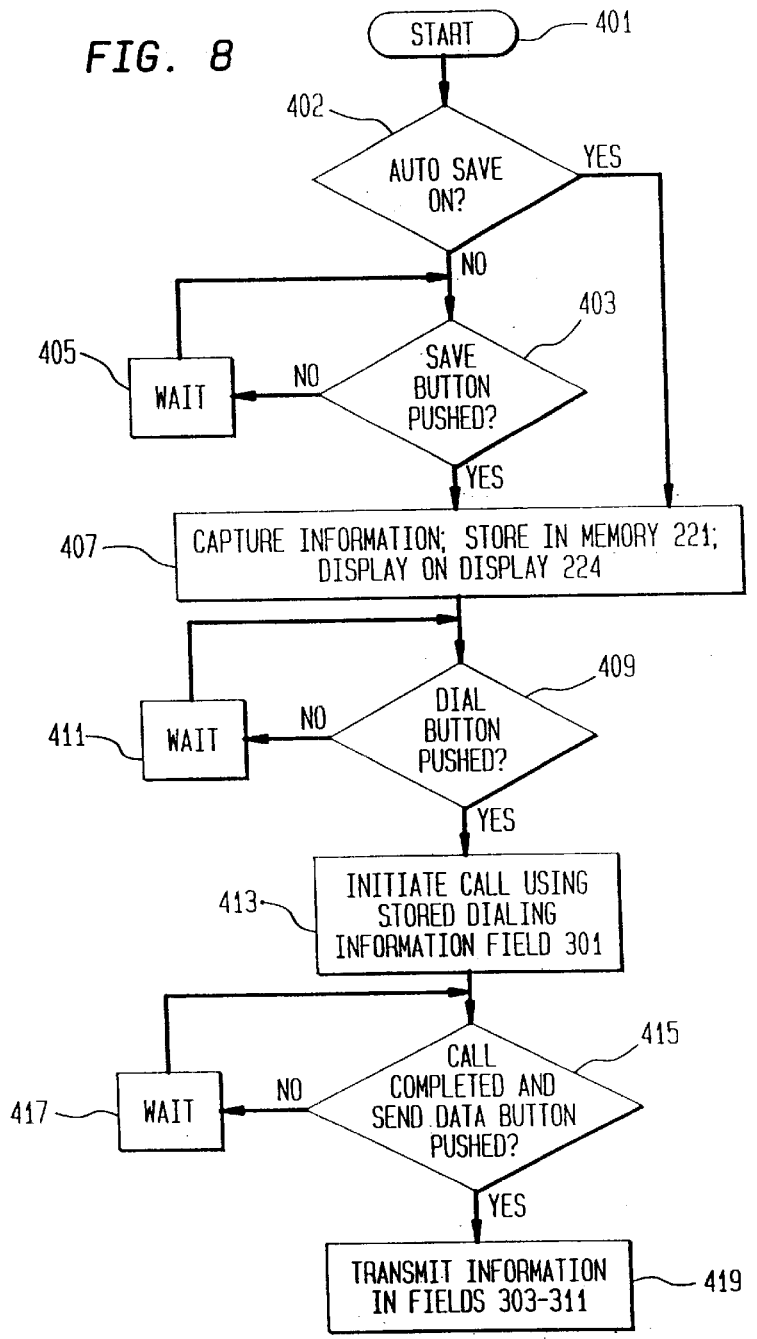

INTEGRATING DIGITAL DATA WITH PERCEPTIBLE SIGNALS

BACKGROUND

The invention relates to integrating digital data with perceptible signals.

In copending and commonly assigned patent application filed by K. G. August et al. and entitled "System And Method For Wireless Capture Of Encoded Data Transmitted With A Television, Video Or Audio Signal And Subsequent Initiation Of A Transaction Using Such Data," filed Nov. 15, 1994 as application Ser. No. 08/339,538, now abandoned, a portable capture device is used to capture in a wireless manner encoded non-discernable data from a light emitting device such as a television or other video or audio output device. The capture device uses the captured data to initiate a transaction, such as placing a telephone call and transmitting a message to a remote agent or automated attendant, and delivering the data to a point-of-sale agent directly or indirectly via a telecommunication connection.

This data is part of the ordinary program displayed by the device and yet non-discernible by a viewer or listener. As an example, a television monitor may be located in a kiosk or other public area, and display the advertising of selected services and products. The non-discernible data may be information needed to order those services or products, including prices, delivery intervals, shipping details, coupon offers, and other related information.

Capture can be effected by decoding non-discernibly modulated video broadcast signals, in a manner suggested in U.S. Pat. No. 4,807,031, issued on Feb. 21, 1989, to R. S. Broughton, et al., the teachings which are incorporated herein by reference in their entirety. Encoding, transmission and decoding of non-discernable data may be accomplished as described U.S. Pat. No. 5,663,766, "System and Method for Encoding Digital Information in Television Signal" to T. Sizer, which is incorporated herein by reference.

In U.S. Pat. No. 5,570,295, issued Oct. 29, 1996, entitled "System and Method of Capturing Encoded Data Transmitted Over a Communications Network in a Video System" filed on behalf of Isenberg and Tuomenoksa and (hereby incorporated by reference in its entirety), non-discernable information can be encoded in a television program, captured in a "set top box", and thereafter used to make telephone calls. The set top box is an electrical device that is "hard-wired" directly in the circuit between the video services network and the television set (as a stand alone unit or alternatively as part of the television set itself) and thus, unfortunately, is not portable. Also, the set top box is dedicated to one particular television (or other video source) and thus cannot be shared among several sources. Finally, the user of the set top box may be uncertain as to the nature of the information captured therein.

A data stream may be encoded onto the acoustical signal of a video program, and received at a detector that filters the data from the human room sounds and the acoustical signal by means of a high-pass filter, as disclosed in copending patent application Ser. No. 08/844,047, "Apparatus and Method for Initiating a Transaction Having Acoustic Data Receiver that Filters Human Voice," by K. G. August et al. This application is incorporated herein by reference.

The above disclosures provide a system and method for initiating a transaction using the wireless capture of information obtained from a video/audio device, and for benefit of this invention, more particularly from an audio device such as a radio in a car or home premises. The wireless capture device acts as an acoustic data link where encoded data is transmitted from a source to the wireless capture device using sound waves. The wireless capture device includes a microphone for capturing the sound waves.

SUMMARY OF THE INVENTION

In general, in one aspect, the invention features a method that includes the steps of modulating a data stream onto a signal representing program material for human perception, the modulating using a spread spectrum encoding of the data stream; transducing the signal into perceptible form; capturing the perceptible signal and transducing it into an electromagnetic form; and extracting a data stream from the received signal, the extracting using a spread spectrum decoding.

In a second aspect, the invention features a method for distributing information. A data stream is modulated onto a perceptible signal using an encoding that leaves the data stream non-discernable, and a device monitors the perceptible signal. The device extracts the data stream from the perceptible signal, and stores it for future use.

Embodiments of the invention may provide one or more of the following advantages. An acoustic data capture device can be used in the presence of human voices without compromising the privacy of the human speaker or speakers. When a microphone is an integral part of a wireless capture device, a storage device of the capture device can store the transaction data, while a display, such as an LCD screen, can display at least a portion of the transaction data to a user. The transaction data also can include dialing information for originating a telephone call. The transaction data can also include descriptive information about an advertisement or solicitation that is associated with the audio signal. The capture device can include a portable phone. Means for originating a telephone call can be contained in a personal base station. Transaction data is transferred to the portable base station, which processes the data and originates a telephone call.

DESCRIPTION OF THE DRAWINGS

The present invention will be more fully appreciated by consideration of the following description, which should be read in light of the accompanying drawings in which:

FIG. 1 shows an acoustic embodiment of the invention.

FIG. 3 shows an optical embodiment of the invention.

FIG. 7 illustrates one example of the format of captured data.

FIG. 8 is a flow diagram of the process by which data embedded in a non-discernable visual or non-audible message is captured and used.

DETAILED DESCRIPTION

Figure 2:
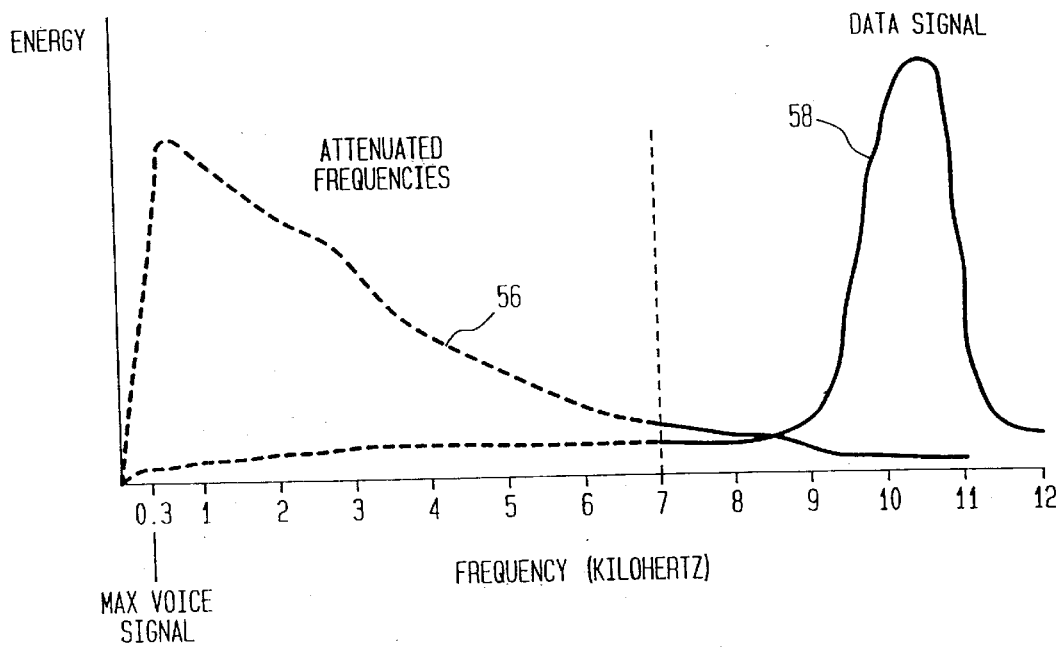
FIG. 2 is a spectrum showing the separation between a voice and an encoded data stream.

Referring now to FIG. 1, program signal 12 (which may be a perceptible signal such as, but not limited to, an audio signal, a video signal, a television (i.e. TV) signal, and or the like carrying program material in audio, video, and or the like format) and a data steam 16 are combined by a spread spectrum encoder/modulator 18 to produce a signal 19 that incorporates both the original program and data stream 16. Signal 19 is broadcast, and received by a consumer at a monitor 10; the monitor may be a device allowing human beings to perceive a signal carrying program material such as, but not limited to, a display monitor, radio, television, and or the like. Audio signal 20 is played into a room by loudspeaker 106. Audio signal 20 is perceived by human being 22. The encoding of data stream 16 is such that the effect on audio signal 20 is imperceptible, or at least unobjectionable. A capture device 110 (which may be a device allowing for the capture of a data stream 28 such as, but not limited to, a wireless phone, monitor, computer, television, receiver, and or the like) continuously receives the audio signal, for instance using microphone 14, and a spread spectrum decoder 26 captures the data stream 28 from audio signal 20. Optionally, human being 22 can generate more data 32, for instance using a handheld device 30 similar to a TV remote channel clicker. The captured data stream 28 and the data 32 produced by the human being are combined, and the combined data 34 are sent to a remote location, for instance back to the information provider. Alternatively, capture device 110 may store the captured data, either for future use or to initiate a transaction with a seller of goods.

Monitor 10 and loudspeaker 106 can be any device for transducing a signal to an acoustic wave, such as a radio, or the audio channel of a television or video or audio tape player. Wireless capture device 110 could be a cellular phone, such as used in an automobile, which would include appropriate processing apparatus for retrieving transaction data from the audio signal and then initiating a transaction by dialing a telephone number retrieved from the transaction data. Alternatively, capture device 110 could be any device with a microphone and a means for transmitting data.

Spread spectrum decoder 26 is only sensitive to the digital data encoded onto the audio signal by spread spectrum encoder 18. Thus, signal 34 sent to the remote location contains no component corresponding to any conversation that the human beings may be having with each other.

Spread spectrum techniques permit data stream 16 to be encoded at a very low level over a large frequency range. Decoder 26, when using spread spectrum decoding coherent with the spread spectrum encoding at encoder 18, is sensitive to very low amplitude encodings. If part of the encoded information is damaged, the information can usually still be recovered, because the information is uniformly distributed over a large portion of the audio frequency band and is robust enough to handle partially recovered encoding information. Because the encoding level is so low and is distributed throughout the audio band, encoded data stream 16 is either inaudible or is heard as only a very soft "static" type sound that is only discerned by the most demanding listeners. The combination of near-inaudibility and robustness make spread spectrum encoding particularly attractive.

As shown in the graph of FIG. 2, the acoustic frequencies occupied by the human voice are shown on the curve 56, and typically occupy the 100 Hertz (Hz) to 4,000 and 6,000 Hz range, with the maximum energy occurring about 300 Hz to about 2000 Hz. Thus, if in one non-limiting example, the data signal is encoded primarily on a carrier frequency above about 6,000 Hz to 7,000 Hz, encoded data stream 16 will not interfere significantly with the intelligibility of the acoustic signal, and any conversations will not interfere significantly with the data stream. This frequency separation is not required for an operative embodiment of the invention, because spread spectrum techniques successfully transmit data in frequencies already occupied by other signals. Nonetheless, because the human ear is less sensitive to higher frequencies, it may be desirable to encode the data stream in higher frequencies in order to reduce the perceptible distortion of the audio signal. It is believed that frequencies of about 16–20 kHz are especially desirable (because they are within the frequency response range of most loudspeakers, but above the perceptible range of most humans), and a data rate of about 100 bits per second.

Referring to FIG. 3, in another embodiment of the invention, data stream 16 is modulated onto the video component of a television signal 12, using a spread spectrum encoding. In this alternate embodiment, optical sensor 117 detects the video signal 50, and decoder 26 extracts data stream 34 from the video signal. A typical video signal contains comparatively large frequency components at the line rate and at the frame rate and its harmonics. Between these frequencies, there are other frequency bands in which little information is carried. One such open frequency band is between 15 and 30 kHz. By adding a low level carrier signal or tone at a frequency in this band, say 25 kHz, the video image is not degraded, but a properly configured decoder 26 can receive and decode the encoded information. In this way, digital information can be non-discernibly modulated onto a video signal by adding to the video signal an amplitude shift keyed (ASK) or frequency shift keyed (FSK) carrier signal, and the digital information can later be captured using ASK or FSK decoding. Encoded data can also be modulated onto a television signal and captured by an optical capture device that responds to the picture displayed on the television, in the manner described in U.S. Pat. No. 4,807,031 cited above.

It may be desirable to filter a frequency band "notch" out of the program material, into which to encode data stream 16.

FIG. 3 also shows that the captured data 34 may be fed to a device in the same room as the human being, for instance a computer 36. The spread spectrum decoder 26 and computer 36 could in fact be combined—for instance, the decoder could be software hosted on computer 36.

As an alternative in FIG. 3, data stream 16 can be modulated onto the audio channel of the video broadcast, and the resultant audio program played into the human being's room. The data would be detected in the acoustic signal, as shown in the right half of FIG. 1. Embodiments where the data are encoded onto the program would likely be especially desirable where the data are location-dependent, for instance road condition information, product information in a shopping center, or lost child information in a mall or amusement park. Consumers walking past a display could be given electronic "coupons" analogous to the paper coupons distributed by dispensers in grocery stores.

The data signal can be modulated onto the perceptible signal (audio signal 12 of FIG. 1 or video signal 50 of FIG. 3) at a constant amplitude. Thus, as the signal level rises and falls, the amplitude of the data stream modulated onto the signal 20, 50 will remain constant. Alternatively, it may be desirable to encode data stream 16 onto the perceptible signal 12 at an adaptive amplitude, for instance using a lower-amplitude signal for the data when the signal amplitude falls. For instance, when the audio channel is playing a silent scene of a video, or a soft passage in a musical program, the data may be modulated onto the signal at a low amplitude. This, in turn, may call for greater redundancy in the coding—as the amplitude falls, the encoding for each message bit may rise from 32 to 64 to 128 to 256 code bits. On the other hand, as the amplitude of the perceptible signal 12 rises, the amplitude of the data stream modulation may be increased, which in turn may allow the redundancy of the encoding to be decreased, and the data rate of the stream to be increased.

In an adaptive amplitude embodiment where the data 16 are modulated onto TV signal 12 at the information provider source, monitor 105 could either simply amplify or attenuate the frequency band occupied by the data (if the data occupy a frequency range with no useful perceptible signal), or could first extract data stream 16 out of TV signal 12, then process data stream 16 in any desired manner, and then recombine the signals in an encoder 18 of FIG. 1.

Figure 4:
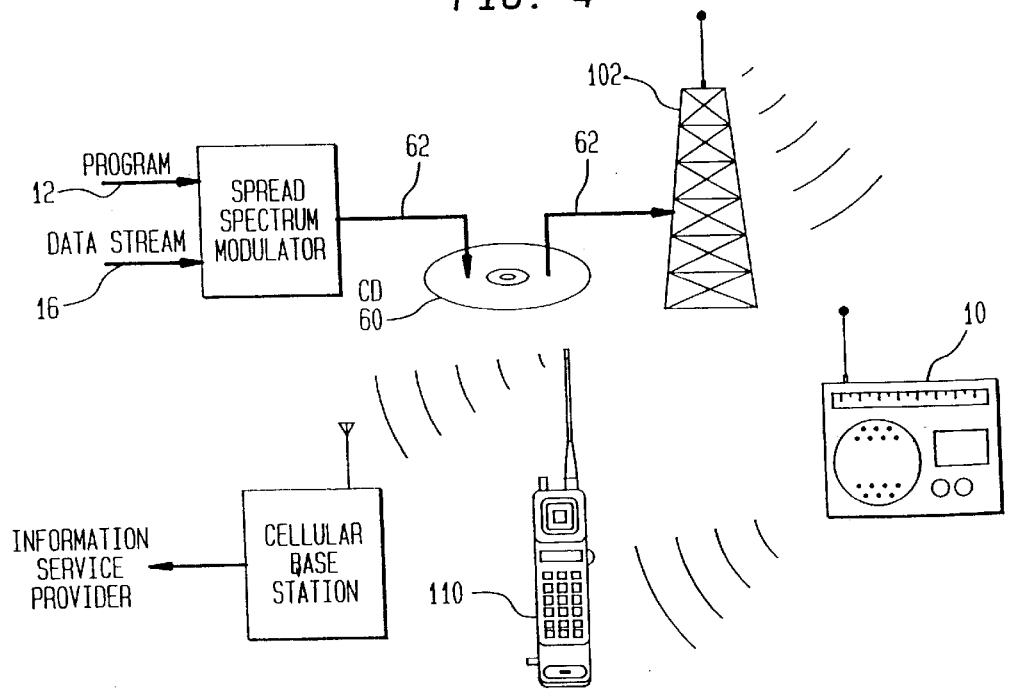
FIG. 4 shows another embodiment of the invention.

Referring to FIG. 4, data stream 16 may be modulated onto the program material 12 either by the manufacturer of a sound recording 60, or at a broadcast transmitter 102. This would simplify monitor 10. The program material with the encoded data 62 would be received by an ordinary radio or television 10, and only capture device 110 would be specially adapted to receive the data.

Specific devices that might be used as the device 10 transducing the encoded signal into a perceptible signal include telephones, televisions, radios, VCRs and other devices, a computer or computer peripheral, an ultrasonic radiator in a security system, a node on a wireless LAN, or a node on a wide-area network. Some of these devices might be programmed by captured data stream 34, others might be commanded by data stream 34. The data might be broadcast to the device 10 over conventional copper land lines, fiber optics, a computer network, over-the-air electromagnetic broadcast, satellite communications, or the internet.

Figure 5:
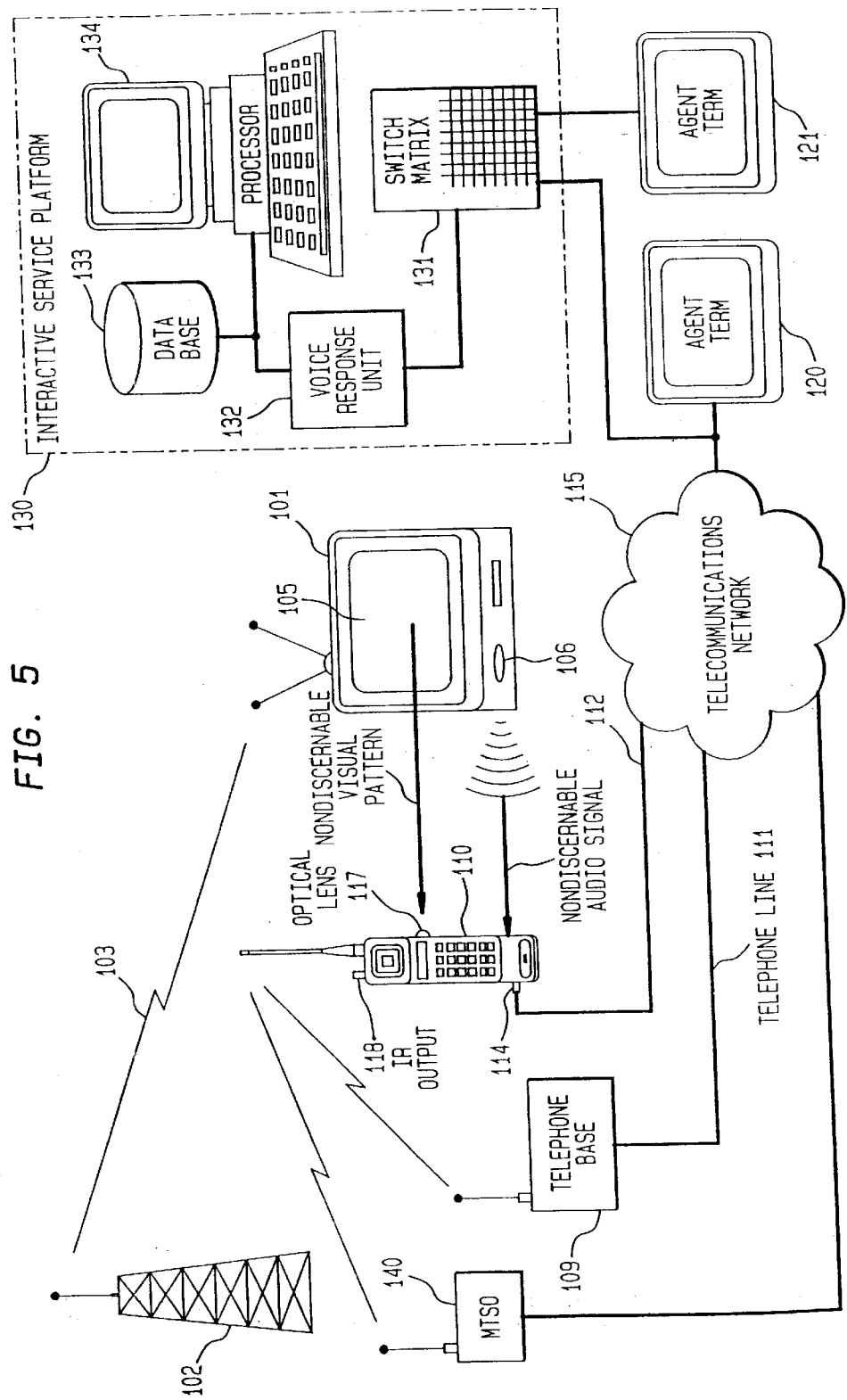
FIG. 5 shows one embodiment of a system arranged for wireless capture of encoded data.

Referring to FIG. 5, the captured data may be used to initiate a transaction with a person at an agent terminal 120, or a person at another terminal 121 that is supported by an interactive service platform 130. For example, the program may be an advertisement for a service or product, and the data stream may convey information needed to order those services or products, including prices, delivery intervals, shipping details, coupon offers, and so-on.

In another alternative embodiment, data stream 16 can be modulated onto the program material 12 using amplitude shift keyed (ASK) or frequency shift keyed (FSK) encoding, for instance using a carrier frequency (e.g. 25 kHz) not usually present in a conventional television signal. This encoding can be added only to the luminance component of a television signal, and the data can thereafter be captured using bandpass filtering and an ASK or FSK capture device.

FIG. 5 also shows another embodiment of capture device 110, in which the encoded data are captured by an optical lens 117 of a portable device such as a wireless phone 110. A television signal is received by television 101 via over-the-air transmission, as from transmission tower 102 via a transmission link 103, or alternatively as supplied by a cable TV connection, or from a VCR/videotape. The video portion of the television signal is displayed on the picture tube or other visual display area 105 of a monitor, computer or a television 101, while the audio portion of the television signal is played from speaker 106. Associated with the program that is seen and possibly heard by a viewer/listener is non-discernible encoded data that is transmitted as part of the video and possibly audio signal.

The program displayed on television 101 is sensed by the portable capture device 110. When the data are encoded on the video signal, such sensing takes the form of light from display area 105 being collected by an optical lens 117. When the data are encoded onto the audio signal, such sensing can take the form of sound from a speaker 106 that is collected by a microphone 14. In either event, there is a wireless communication of the information from television 101 to capture device 110 such that the encoded data is "viewed" or "heard" using conventional loudspeaker 106 or video monitor 105 of receiver 101, rather than transmitted through a wired connection, or through a more conventional radio frequency communication.

Capture device 110 may include a memory for storing the data for later use, and communications circuitry to output at least portions of the data (or data derived from the captured data) to a remote agent or device, such as via a telephone call or a data transfer to a point of sale device. Capture device 110 may be any device conventionally equipped with a microphone, such as a cellular phone. Alternatively, capture device 110 may be any device with a memory, supplemented with a microphone and signal processing capability, for instance a telephone with programmable dialing, or a computer, or a personal digital assistant (PDA). Specific devices that might receive the data stream include telephones, remote controls for televisions, VCRs and other devices, a computer or computer peripheral, a capture device for a security system, a node on a wireless LAN, or a node on a wide-area network. Some of these devices might be programmed by captured data stream 34, others might be commanded by captured data stream 34.

The encoded non-perceptible data can include associated telephone dialing, network routing, or other identification information, so that other portions of the captured data can be transmitted to an appropriate final destination or device. In this context, the final destination can be (a) a remote location, such as a platform arranged to process and consummate transactions, or (b) a point of sale system or other device (e.g., TV, stereo, VCR Plus, a smart mouse device, etc.). The other portions of the captured data are part of the payload to be communicated to the final destination or device, and can include product or coupon information that is related to the display from which the non-perceptible data was captured, as well as programming or control data.

Capture device 110 can include a built-in-display, such as an LCD display, and the encoded non-perceptible data can include display information, so that at least portions of the captured data can be discerned by a user of the device, and the user can thus be kept informed as to the operation of the device. The memory and the communications circuitry in capture device 110 are advantageously arranged so that, in a transaction initiated by the device using captured information, a two-way dialog may be initiated between the user and an agent at a remote terminal or a POTS system, and information may be transmitted to and stored in the device for later retrieval.

In addition to capturing non-discernible encoded data, the capture device 110 may have further capabilities such as (a) storing the encoded data, (b) transmitting (or otherwise outputting) the encoded data (or information retrieved using such data) to a remote location or device, and (c) displaying the encoded data to a user. The data may include information for initiating a transaction or originating a telephone call, as well as additional information (e.g., price and ordering information) associated with the television program being displayed on television 101. The remote location can be agent terminals 120 or 121, interactive service platform 130, or a point of sale system, and the communication between capture device 110 and the remote location may be one-way or two-way.

In the case where encoded data are to be output from capture device 110 via a telephone call, the call may be initiated and transacted in one of several ways, as illustrated in FIG. 5. First, the data may be transmitted over a wireless link to an associated telephone base station 109 that is, in turn, connected to a telephone line 111 that is part of a telecommunications network 115. Communication between capture device 110 and base station 109 may be accomplished in a variety of ways; as an example, the same signaling and transmission can be used as is presently used in communication between a cordless telephone handset and its associated base station. Second, capture device 110 may be directly connected to a telephone line 112 through an interface that includes a standard telephone jack 114. Third, capture device 110 may include the functionality of a cellular telephone, so that the data may be communicated to a remote location via a wireless call placed to a mobile telephone switching office (MTSO) 140, which is in turn connected to telecommunications network 115.

In one particular embodiment, the encoded data describe a product offered for sale, and a telephone number where the product may be ordered. The data may encode an advertisement per se for a product unrelated to the underlying program, or the data and program may be closely related, for instance where a CD manufacturer encodes ordering information over the music on a CD (60 of FIG. 4). A car cellular phone 110 continuously monitors the music played over the car radio. When the driver wants to buy the product advertised or the music being played, the driver simply hits a single button on the cellular phone 110, or may simply utter a preprogrammed voice command, and the cellular phone 110 will dial the encoded telephone number and place the order. This facilitates hands-free dialing, improving safety for the driver and accuracy for the vendor.

The encoded data may also be used by monitor device 10. For instance, radio broadcasters can encode information about their programming format onto their programming. A monitor 10, for instance a car stereo, can then offer a "selection by format" feature—the user simply selects a desired programming format, e.g., "news," "classical music," "talk radio," etc., and the receiver can scan channels until it finds one with the requested format. The selection can be made by known techniques, such as push-buttons or voice recognition.

Advertisers and copyright owners may encode data onto their works, and establish monitoring facilities. For instance, where a broadcast advertising contract provides for a specific number of plays of the ad, an automatic monitoring device can monitor a broadcast to ensure that the ad receives the agreed number of plays. If data are encoded onto music recordings, a music licensing organization such as ASCAP or BMI can monitor broadcasts to ensure that appropriate royalties are being paid by the broadcaster, and to ensure that royalties are correctly distributed to the licensor composers and performers.

Referring again to FIG. 5, if an outgoing telephone call is initiated by capture device 110, the call can illustratively be routed through telecommunications network 115 directly to an agent terminal 120, or to an interactive service platform 130, which is connected to another agent terminal 121. When a connection is completed to platform 130, the call may be routed by a switch matrix 131 to a voice response unit 132 that operates under the control of a processor 134. Information included in the captured encoded can be provided to the attendants, or processor 134 can perform a look-up and retrieval operation in database 131, using encoded data as a key, in order to effectuate a desired transaction.

For certain transactions, information connected with a transaction may also be transmitted from service platform 130 to capture device 110, either for display to a user, storage for later use, or output to a point of sale system or device. This information may, for example, be confirmation information, indicating that a transaction has been effected, or details regarding a just completed transaction, such as ticket information relating to a travel reservation.

Capture device 110 can also use the captured data directly, without making a telephone call, for instance in the case where device 110 is a computer. This is useful in conjunction with a point of sale system or the like, which includes a docking station or other interface to which capture device 110 may be connected, or an infrared receiving device or a device responding to DTMF (dual-tone multi-frequency, the two-tone encoding used in touch-tone telephones).

Figure 6:
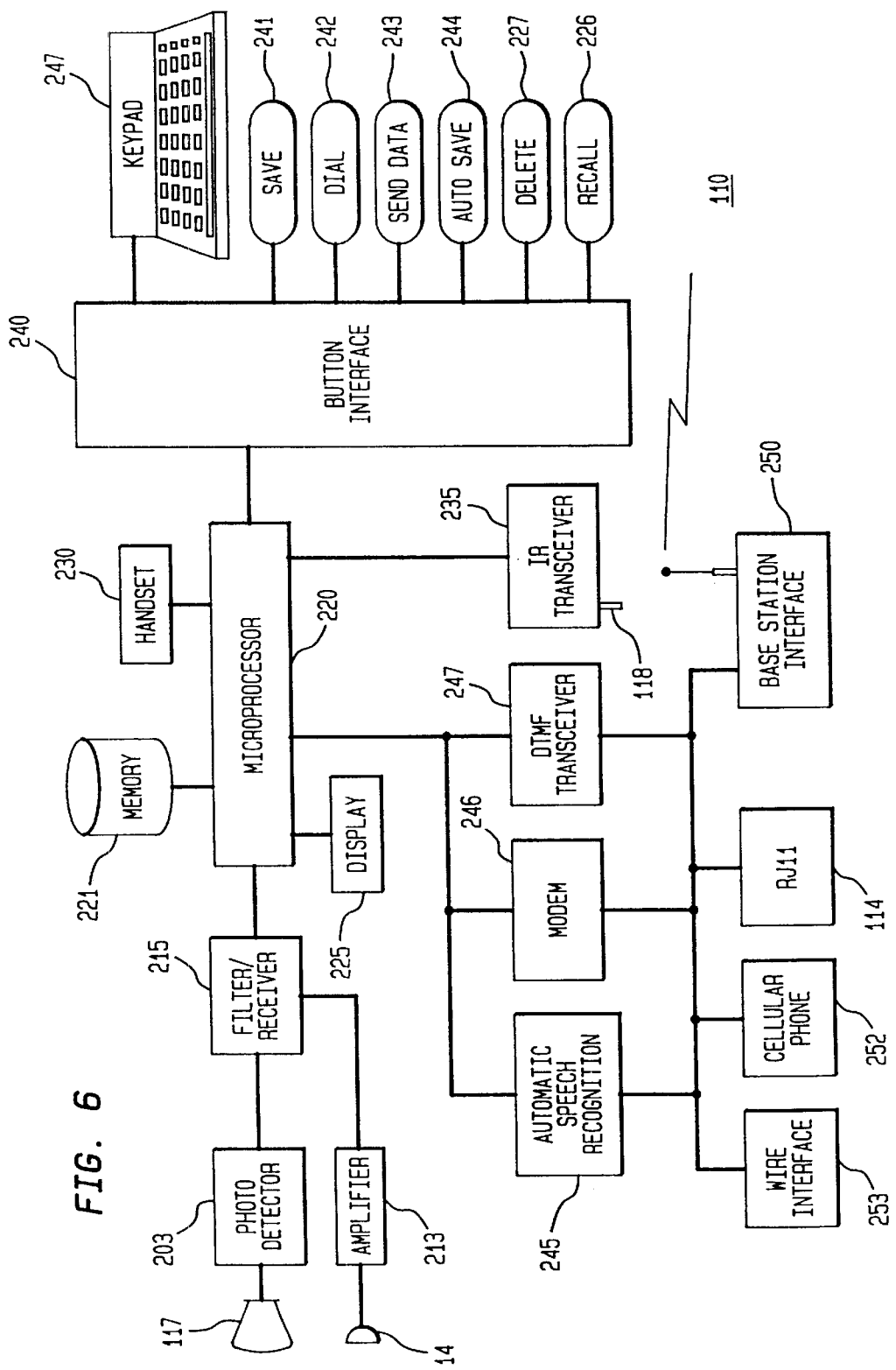
FIG. 6 is a block diagram illustrating the components of the capture device of FIG. 5.

Referring now to FIG. 6 there is shown a block diagram illustrating in more detail the components in one embodiment of capture device 110. If the encoded non-discernable data are modulated onto the video portion of a television signal, the images displayed on visual display area 105 are captured by optical lens 117 and an associated photo-detector 203, which is arranged to supply an electrical signal to a filter/receiver 215 representing the image.

On the other hand, if the encoded non-discernable data is modulated onto the audio portion of a television signal, the output from speaker 106 is captured by a microphone 14 and an associated amplifier 213, which is arranged to supply an electrical signal to filter/receiver 215 representing the sound energy. In either event, the encoded non-discernable data is decoded in the filter/receiver 215 in a manner consistent with the manner in which the original data was encoded. Thus, filter/receiver 215 can be arranged to perform the same functionality as the elements illustrated in FIG. 5 of the above referenced Broughton '031 patent, or, alternatively, the operation of filter/receiver 215 can be as described in conjunction with FIG. 4 or 7 of the Sizer '766 patent. In each instance, it is noted that capture device 110 receives encoded data by "watching" or "listening to" the output of television 101 (or another similar display device), and that capture device 110 is not connected to television 101 or the other display device by a cable or wires.

The output of filter/receiver 215, representing the data captured by capture device 110, is applied to a microprocessor 220, which is arranged to perform various data processing and control functions in coordination with programs stored in an associated memory 221 as well as inputs received from a user of capture device 110. Generally speaking, capture device 110 may operate in an active or a passive mode. In the active mode, capture device 100 responds only to user initiated capture commands. In the passive mode, capture device 110 captures all of the data sent to it while in that mode. In either mode, captured data may be routed by microprocessor to memory 221 and stored for use at a later time, as determined by the user. The captured data may also be displayed on a display 225, such as a liquid crystal display, so that a user will be aware of exactly what information was captured.

The control programs contained in memory 221 can implement numerous functions, which broadly speaking, can be categorized as (a) functions relating to data capture, such as SAVE and AUTOSAVE functions, (b) functions relating to output of already captured data, such as DIAL and SEND DATA functions, (c) functions relating to memory manipulation, such as the RECALL and DELETE functions. The above enumerated functions are initiated when respective buttons 241–246 are activated, and the activation signal output from a button is applied to microprocessor 220 via a button interface 240. Each of the functions is discussed below.

When the SAVE function is initiated by activation of button 241, capture device 110 is in the active mode, and the encoded data contained in the current audio or video output of television 101 is captured. This is accomplished, for example, by activating optical lens 117 and photo detector 203, or microphone 14 and amplifier 213, for a relatively brief period of time, typically on the order of several seconds, so that encoded data associated with the current program which is displayed on display area 105 or played through the loudspeaker 106, is processed by filter/receiver 215 and stored in memory 221. A visual or auditory cue may be contained in the video or audio program to indicate to a user of a capture device that there is data to be captured. When the SAVE function is activated, the microprocessor 220 may control display 225 to indicate the current status, e.g., that capture device 110 is in the process of capturing data. When the data has been captured, the microprocessor 220 may control the display 225 to actually display some or all of the data, so that the user can be aware of information that had been non-discernable. The display can also indicate that the device is "aimed" correctly.

When the AUTOSAVE function is initiated by activation of button 244, capture device 110 is in the passive mode. In this mode, capture device 110 captures a series of encoded data that may be contained in each of a series of programs that can be viewed or heard on television 101. This can be accomplished, for example, by activating optical lens 117 and photo detector 203, or microphone 14 and amplifier 213, for a relatively long period of time, typically on the order of several minutes or hours. Encoded data captured from the various programs that are displayed on display area 105 or played through loudspeaker 106 over a long period of time are processed by filter/receiver 215 and stored in memory 221. As with the SAVE function, when the AUTOSAVE function is activated, microprocessor 220 may be arranged to control display 225 so as to indicate the current status, e.g., that capture device 110 is in the process of capturing data.

When a user of capture device 110 desires to use any of the data stored in memory 221, including data stored as a result of the AUTOSAVE function, the contents of the memory 221 may be retrieved and displayed on display 225 by initiating the RECALL function upon activating button 226. This permits a user to be aware of exactly what information was previously captured and stored. Through this function, the user will be able to selectively peruse or scroll through the stored data, so as to retain or use selected portions thereof. Activation of button 227 initiates the DELETE function, whereby portions of the data stored in memory 221 are selectively erased. In order to conserve and thereby "recycle" the storage capacity of memory 221, the microprocessor 220 may also be arranged to manage the contents in memory 221, so that the oldest information stored therein could be cycled out and deleted as new information is captured and stored.

Turning now to consideration of the use of already captured data, it is an important functionality of capture device 110 to permit such data to be output upon a command from a user. Such data, when output, can be used to (a) make a telephone call, and, when the call is answered, to provide information to a live or automated attendant that received the call, or (b) initiate a transaction, such as by interacting with a special purpose terminal or kiosk arranged to receive the stored data, or a device such as a VCR Plus or a stereo. In accordance with the arrangement shown in FIG. 6, data output via a telephone call can be initiated in several ways.

First, captured data can be routed by microprocessor 220 from memory 221 to a modem 246 and then to a base station interface 250, so that the information can be communicated to telephone base 109 of FIG. 5. This in turn allows a conventional telephone call to be originated from telephone base 109.

Second, captured data can be routed through modem 246 to a wire interface 253, which allows capture device 110 to be physically connected to a terminal or docking station for information off loading.

Third, captured data can be routed to a dual tone multi-frequency (DTMF) transceiver 247, which includes a tone generator arranged to output DTMF tones. These tones can be directly connected to a telephone line 112 via a standard connection such as RJ11 jack 114. Alternatively, capture device 110 can be placed in juxtaposition with the microphone in a 10 telephone handset, and the audible tones can be applied and used much like an audible frequency autodialer, such that the audible tones generated in capture device 110 are acoustically coupled through the handset to receivers in telecommunications network 115.

Fourth, captured data can be routed through modem 246 to a cellular telephone 252, which can initiate a cellular call. When a cellular connection is completed, the captured data can be output in encoded form or an audible tones.

For each of the arrangements just described, a telephone call may be originated using the DIAL function. This function in initiated by activation of button 242. With this function, dialing information, which is part of the data captured by capture device 110 and now stored in memory 221, is retrieved. This information is then further processed, so that a telephone call can be initiated. In some instances, a call is originated by application of stored data to DTMF transceiver 247, so that audible tones can be output. In other instances, a data call can be iinitiated by appropriately formatting stored data. In yet other instances, such as when a cellular call is dialed, stored dialing information may be applied to an outgoing number register. The exact manner in which information is output from capture device 110 can vary, in accordance with several embodiments of the present invention.

While the DIAL function is used to output certain captured information needed to initiate a telephone call (or other data output function), the SEND DATA function, initiated by activation of button 243, is used to output other portions of the captured data stored in memory 221, pertaining, for example, to a transaction that the user desires to make. This additional data is retrieved from memory 221 and appropriately transmitted, depending upon the manner and type of telephone call involved. Thus, data may be output either via base station interface 250 to telephone base 109, or via RJ11 jack 114 onto telephone line 112, or via cellular phone 252 to MTSO 140. Note that if output occurs directly, without a telephone call, the SEND DATA function may cause information from memory 221 to be output via wire interface 253. During the SEND DATA function, the information being output may also be displayed on display 225. This allows a person using capture device 110 to identify the information that was captured, and use the information in an actual transaction.

It is to be noted here that capture device 110 of FIG. 6 may optionally include an automatic speech recognition circuit 245, an infrared (AIR) transceiver 235, a handset 230 and a keypad 248. The purpose of IR transceiver 235 is to allow captured data to be output directly to a device such as a point of sale system or a VCR or the like, via infrared transmission. The purpose of speech recognition circuit 245 is to convert captured data to spoken phrases, which can be played to a user or to an attendant after a telephone call is initiated. The purpose of handset 230 and keypad 248 is to allow capture device 110, in addition to being used in accordance with the present invention, to be used to complete conventional dialed telephone calls.

In one application of the present invention, a televised advertisement for a product includes additional ordering or "coupon" information embedded in a non-discernable visual pattern within the video image displayed on visual display area 105. The coupon information describes the item(s) offered for sale, the regular price, the coupon value, and contains additional information needed for ordering. This embedded information is transmitted between television 101 and capture device 110 at a rate such as 60 bits per second, that is sufficient such that the necessary information can be transmitted in a very brief period of time. In the application just described, the embedded product information, dialing number, coupon information and necessary checkbits together comprise approximately bits of information, so that between three and twenty seconds would be required for transmission. Once the coupon information is stored in capture device 110, the user of capture device 110 can supplement the coupon information with user entered data which can be entered using keypad 248. This supplemental information may include credit card or other billing information pertaining to the user, as an example.

As shown in FIG. 7, the information represented by the encoded data can be organized in several fields. Using the coupon application as an example, a first field 301 contains a telephone number which may be used to originate a telephone call in order to order the product to which the coupon applies. Illustratively, this will be a toll-free or "800" number. Other information associated with the coupon can include a product description in field 303, an expiration date in field 305, the time that the advertisement is televised in field 307, the number of television channel running the ad in field 309, and a serial number for the ad in field 311, identifying either or both the particular ad and its sequence in an ad campaign. It is to be noted that various other information can also be included in the information illustrated in FIG. 7, such as keywords or attributes describing the received encoded data, as well as information indicating that a product is available in particular colors or sizes. The keywords would be useful in retrieving from memory 221, information relating to specific products or advertisers.

The process by which information embedded in a non-discernable visual or audible message is captured and used is illustrated in flow diagram form in FIG. 8. As indicated previously, two general modes of operation are contemplated, namely a "passive" mode and an "active" mode, both of which follow a "start" step 401.

In the passive mode, a user desires to operate capture device 110 in an unattended manner, and to capture all of the encoded data that may be non-discernibly displayed on a display device 105 or output from speaker 106 over a relatively long period of time, typically several minutes or hours, until the user, at some later time, desires to discontinue or terminate the capture. This mode is initiated using AUTOSAVE functionality, by activating button 244. When this is done, a positive response is obtained in step 402, so that data capture, storage and display, all as described below in connection with step 407, occur. While in the passive mode, capture is terminated by subsequent activation of the same button 244.

In the active mode, a user operates capture device 110 in real time, typically while viewing a video display or listening to an audio presentation. During the display or presentation, the user sees or hears a corresponding televised advertisement or other indication that non-discernable information is available for capture. The user may, at this time, be instructed to activate SAVE button 241, or the user may know, from previous experience, how to use the device. When button 241 is activated, a positive result occurs in step 403, thereby capturing the non-discernable encoded data, displaying all or a portion of the data on display 225, and storing same in memory 221, all in step 407. Until the SAVE button is activated, capture device 110 may be in a "wait state" 405.

The user of capture device 110 determines that the appropriate data has been captured by reviewing the information seen in display 225. In step 409, after the captured data has been reviewed and determined to be correct, activation of the DIAL button 242 on the portable capture device 110 initiates step 413, by which stored dialing and/or routing information, illustratively in field 301 of FIG. 7, is recalled from memory 221. A call is then originated, such by transmitting the dialing information from memory 221 through base station interface 250 to base station 109 and thence to telephone line 111 and telecommunications network 115 to interactive service platform 130. The call may be a local or long distance call made using a "plain old telephone service" (POTS) line; alternatively, a toll-free call may be launched using an 800 number. Desirably, automatic number identification (ANI), caller ID, and other features available in the telecommunications network may be used to provide additional information to the called party, in addition to the captured data that is transmitted in succeeding steps in the process. Until the DIAL button is activated, capture device 110 may be in a "wait state" 411.

After the call has been originated, a determination is made in step 415 that the call has been answered and that the SEND DATA button 243 has been pushed. (Until the SEND DATA button is activated, capture device 110 may be in a "wait state" 417.). When a positive result occurs in step 415, information contained in fields 303–311 is transmitted to the called destination in step 419. As stated previously, from the point of view of the called party, the information received includes details concerning the advertised product, the identity of the caller, and other information associated with the item that was initially displayed or mentioned on the television program. Advantageously, the advertiser will know more about their customer than ever before. This is because the advertiser will be able to determine from the transmitted information which advertisement drew the business, how long it took the caller to respond to the ad, and the geographic location of the callers, based upon ANI or caller ID. It will be easy to tell which advertisements in a campaign are most successful.

In accordance with one optional arrangement of the present invention, when data is captured and stored in step 407, the newly collected data is compared with previously stored data. When a match is found, any duplicate data is dropped. In addition, the information in various fields is examined, to assure that the data captured is in the appropriate format. If an error is detected in any data, the information may be deleted, and "new" data collected. This is accomplished by repeating capture step 407 several times.

In another application of the present invention, an interactive television capability is provided in connection with a game show or television drama. For a game show, an audience would be asked to vote on various aspects of the game. This could include questions such as which person should go on a date with the contestant, or which singer is the best? The audience would be instructed to press the "SAVE" button on their capture device at the appropriate time specified for their choice. The viewers vote would then be cast by depressing the DIAL button, communicating with the game show host, and then transmitting information indicating the vote by depressing the SEND DATA button. Alternately, one number could be transmitted and an automated interactive voice platform such as the InfoWorx™ platform available from AT&T could offer options to the caller. These calls could be toll free calls, or, alternatively, billed to the caller.

In yet another application of the present invention, a video on demand capability can be provided. A viewer sees a video he or she would like to see advertised on a previewing network. An instruction to press the DIAL button on capture device 110 is made on the previewing channel to indicate to the viewer that he or she can press the button to order a particular video. The call would be placed to a voice response system used to reserve the video on demand. Information about which video the caller wanted to see is sent over the phone lines once the call is connected. The caller would merely have to acknowledge the order and select a time slot.

The present invention can also be employed in the context of programming of a VCR, particularly where the user already has the capabilities provided by VCR Plus, a product that is commercially available. In this embodiment, a code sequence associated with and representing a particular television show constitutes the information included in a televised advertisement. When the ad is viewed, the viewer can press the SAVE button and send the sequences to the VCR Plus using IR transmitter 235. While the portability of capture device 110 is advantageous, it is to be noted that in some arrangements, the functions of capture device 110 and telephone base 109 may be combined in a single stationary unit, which might resemble a cordless telephone base station. In this event, the functionality of capture device 110 would be included in the stationary unit, and that unit would be arranged, in the manner previously described, to collect information. In this arrangement, the stationary unit could also be adapted to utilize input devices such as optical character recognition (OCR) or scanners that would provide an additional method of inputting telephone numbers and coupon and/or product information. The hand piece of this stationary unit would be used to place a call and send the data.

The present invention is not limited to live televised programs, but can also be operated in conjunction with stored video programs played from a VCR. In this arrangement, advertisements and other encoded information is included in videos at the time they are recorded or at the time they are mastered and put onto video cassettes. A viewer watching a video with such an ad can respond immediately to reserve another video, purchase one of the items advertised, or order catalogs automatically. When a program containing non-discernibly encoded data is viewed, the viewer simply presses the DIAL button, launching a telephone call, and then presses the SEND DATA button, sending captured data, such as product information, to an agent, who can verify the order using the additional information that was captured or stored in the device.

The portability of the present invention can be used to advantage in implementing what can, in effect, be called a "Roaming Bulletin Board". A user can be attending a conference or traveling through the airport where kiosks or bulletin boards are set up. In the case of a conference, an attendee would walk through the conference viewing the displays. When the attendee sees a display of interest, he or she points capture device 110 towards the display, and captures the non-discernible encoded data from either the displayed image or the sound output. Later, the user launches a telephone call to the telephone number specified and included in the captured data, and sends out coupon information that is also part of the captured data.

It is further to be noted that the present invention can be used in the context of automobiles and mobile telephones. When a capture device in accordance with the invention is placed in a car, it can receive and capture non-discernible encoded data contained in the audio output of the car radio. The captured data can include a toll free or conventional telephone number for originating a mobile cellular telephone call from the car. The call may be placed to an interactive service platform, and additional captured data, such as coupon or similar information, can then be used to effectuate a transaction.

Figure 9:
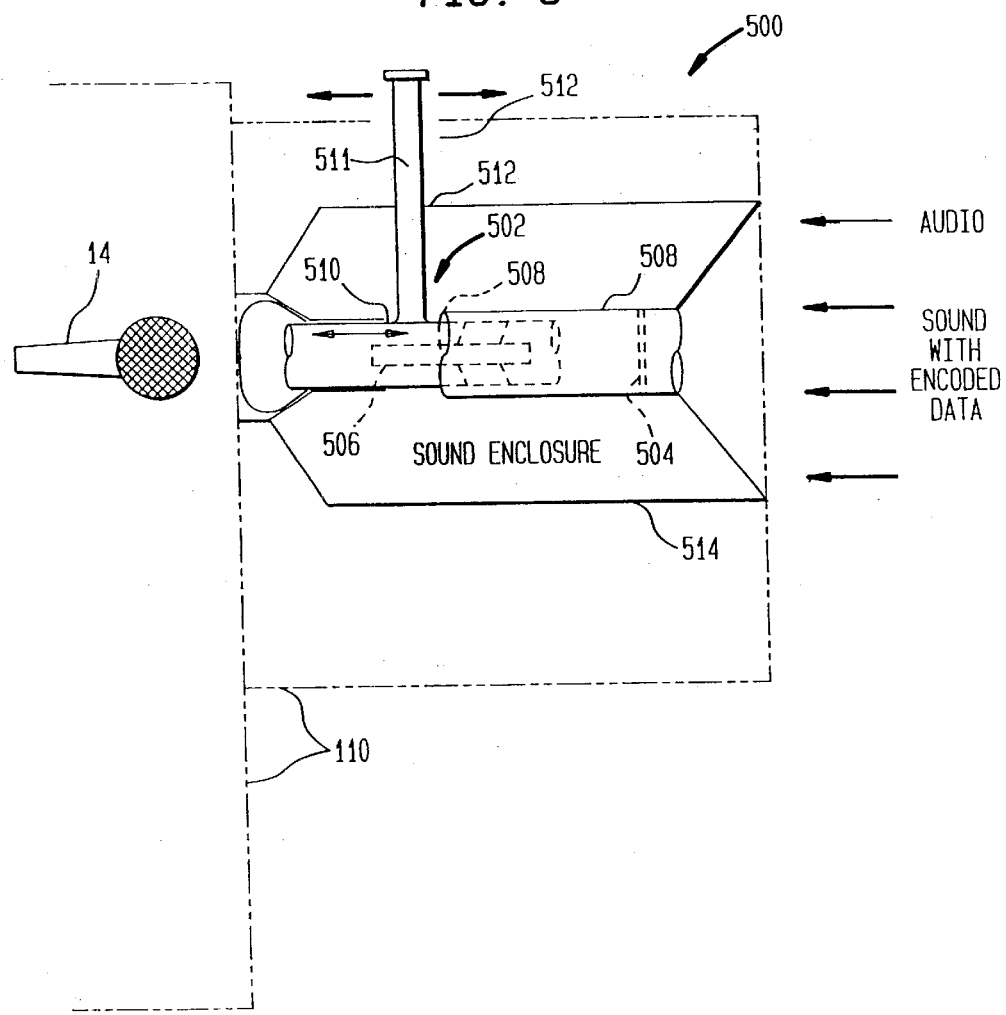
FIG. 9 is a cutaway view of an embodiment using an acoustic filter.

Referring to FIG. 9, in an alternative embodiment, non-discernable data can be captured by interposing an acoustic or electrical filter that can sufficiently attenuate the human voice frequencies to make them unintelligible. For instance, a high-pass (or band-pass) filter that passes only frequencies above about 7,000 Hz would effectively eliminate intelligible human voice signals. Such a filter response was shown on curve 58 on FIG. 2. For example, if the filter passes frequencies above 7,000 Hz, as shown by curve 58, and the data signal was at about 10,000 Hz, and occupied a sufficiently narrow bandwidth within the filter's pass band, then the data signal would not be significantly attenuated or distorted by the filter. Thus, the data signal would be substantially unaffected.

Referring now to FIG. 9, an acoustic high pass filter 500 can be placed before microphone 14 to exclude almost all the voice signal from reaching the microphone. This high pass filter 500 is constructed from a tube 502 having a diaphragm 504 at one end and microphone 14 at the other end. A open stub 506 is placed at its mid portion. Tube 502 can be formed from two slidable sections 508 and 510, so that it can be extended along its length by using handle 511, which extends though associated slots 512 formed in the tubes 508, 510 and capture device 110, as a handle to adjust the length of the tube 502. The position and length of the stub 506 relative to the tub sections 508, 510 changes the desired filtering characteristic of the filter 500. Other construction methods and types of filters are known to those skilled in the art.

This filter 500 is mounted in a sound absorbing enclosure 514, which prevents sound from reaching the microphone 14 unless the sound passes through the filter. In this embodiment, only those sounds at frequencies higher than those needed for intelligible human speech reach microphone 14. As a result, human speech cannot be reconstructed from the electrical signal coming from microphone 14. A person with access to the electrical signal from microphone 14, such as through data transfer or by processing apparatus connected to microphone 14 would not be able to reconstruct human speech signals that might be present in the vicinity of microphone 14.

Figure 10:
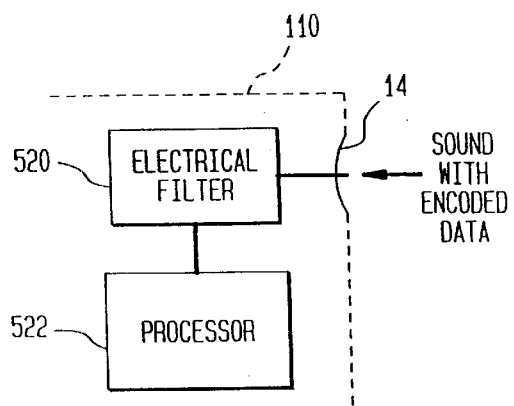
FIG. 10 is a block diagram of an embodiment using an electronic filter.

FIG. 10 illustrates another embodiment using an electrical filter 520 positioned after microphone 14 to exclude almost all voice signals from reaching any data communication or processing apparatus that receive the data captured by capture device 110. Microphone 14 receives an audio sound signal and converts that sound signal into an electrical signal. The resulting electrical signal is passed through the filter 520 which removes those frequencies necessary to reconstruct human speech. The techniques used to build such an electrical filter are well known to those skilled in the art. The electrical output of the filter is connected to the processor 522. Because the frequencies needed to reconstruct intelligible human speech are not present after the output of the filter 520, someone with access to the signal, such as communication or a processor apparatus, could not reconstruct human speech signals that might be present in or near the acoustic data link generated by monitor 10.

Various modification and adaptations of the present invention will be apparent to those skilled in the art. For example, the functions provided by the present invention may be combined with those used in a personal digital assistant (PDA) or a lap-top computer. If desired, a simultaneous voice and data (SVD) modem of the type available now from AT&T could be provided in capture device 110 to allow communication both by voice and data transfer, at the same time. Various functions can also be added to the processes and applications described. For example, telephone base 109 may be programmed to dial a number or series of numbers at specific times, when certain amounts of information or data have been collected, or based upon some criteria. Capture device 110 could then send collected information "in bulk" to interactive service platform 130. For this purpose, modem 246 could be used, so as to send the information more efficiently.

What has been described is merely illustrative of the present invention. Other applications to wireless telephones, computers or other communication systems other than the disclosed system are contemplated and may be utilized without departing from the spirit and scope of the present invention. Other embodiments will be understood to be within the following claims.

We claim:

1. A method, comprising:
   modulating a data stream onto a signal representing program material for human perception, the modulating using a spread spectrum encoding of the data stream;
   transducing the modulated signal into perceptible form;
   capturing and filtering the perceptible signal and transducing it into an electromagnetic form, the filtering removing most of the energy of human voices from the perceptible signal, and extracting a data stream from the filtered signal, the extracting using a spread spectrum decoding;
   initiating communications in response to the extracted data stream, wherein a destination and content of the communications are determined at least in part by the extracted data stream.

2. The method of claim 1, wherein the filtering comprises:
   passing said perceptible signal through a filter passes frequencies above 7000 Hz.

3. The method of claim 1, wherein:
   the data signal is modulated onto the program signal in a device for transducing said program signal into said perceptible form.

4. The method of claim 1, wherein:
   said data stream is encoded for initiating and completing a transaction between a human being perceiving said perceptible signal and a vendor of a product described by said data stream.

5. The method of claim 4, further comprising:
   displaying on a visual monitor information describing the transaction.

6. The method of claim 4 wherein said data for initiating and completing said transaction includes dialing information for originating a telephone call.

7. The method of claim 4 wherein said data for initiating and completing said transaction includes descriptive information about an advertisement or solicitation for goods or services associated with said program signal.

8. The method of claim 1 wherein said capturing is performed by a portable phone.

9. The method of claim 1 wherein:
   the modulating of the data stream employs an adaptive encoding method.

10. The method of claim 9, wherein:
    the data stream is modulated onto the perceptible signal at an adaptive amplitude.

11. The method of claim 9, wherein:
    the data stream is modulated onto the perceptible signal at an adaptive coding redundancy.

12. The method of claim 9, wherein:
    the data stream is modulated onto the perceptible signal at an adaptive code bit transmission rate.

13. The method of claim 1, further comprising:
    employing the extracted data stream to establish a communication path between a device performing the capturing and a vendor of goods or services.

14. The method of claim 1, further comprising:
    storing data extracted from the captured data stream at a device at a location of the capturing of the perceptible signal.

15. The method of claim 14, further comprising:
    employing the stored data to establish a communication path between a device performing the capturing and a vendor of goods or services.

16. The method of claim 14, further comprising:
    employing the stored data to program future responses of said device at the location of the capturing of the perceptible signal.

17. The method of claim 18, wherein:
    the programmed response includes hands-free initiation of a telephone call by the device.

18. The method of claim 16, further comprising:
    initiating the programmed response in reaction to the action of a human being.

19. The method of claim 1, further comprising:
    based on the extracted data, initiating an action of a device at a location of the capturing of the perceptible signal.

20. The method of claim 1, further comprising:
    generating a visual display of data extracted from the captured data stream.

21. The method of claim 1, wherein the data stream is modulated onto a live acoustical performance.

22. A method comprising:
    modulating a data stream onto a signal representing program material for human perception, the modulating performed by a manufacturer of a sound recording of a program signal, the modulating using a spread spectrum encoding of said data stream, the data stream encoding data for initiating and completing a transaction between a human being perceiving said program signal and a vendor of a product described by said data stream;
    transducing the modulated signal into perceptible form;
    capturing the perceptible signal and transducing it into an electromagnetic form, and extracting said data stream from the perceptible signal, the extracting using a spread spectrum decoding;
    initiating communications in response to the extracted data stream, wherein a destination and content of the communications are determined at least in part by the extracted data stream.

* * * * *